(12) United States Patent
Kim et al.

(10) Patent No.: US 8,798,356 B2
(45) Date of Patent: Aug. 5, 2014

(54) APPARATUS AND METHOD FOR ENCODING AND DECODING MULTI-VIEW IMAGE

(75) Inventors: Dae-Hee Kim, Suwon-si (KR); Jae-Woo Jung, Cheonan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 597 days.

(21) Appl. No.: 12/700,186

(22) Filed: Feb. 4, 2010

(65) Prior Publication Data

US 2010/0195900 A1 Aug. 5, 2010

(30) Foreign Application Priority Data

Feb. 4, 2009 (KR) .................. 10-2009-0009066

(51) Int. Cl.
*H04N 15/00* (2006.01)
*G06T 9/00* (2006.01)

(52) U.S. Cl.
USPC ........... 382/154; 382/232; 382/223; 382/236; 382/294; 348/385.1; 348/397.1

(58) Field of Classification Search
CPC ............... H04N 19/00769; H04N 13/0048; H04N 13/0003; H04N 13/0059; H04N 7/26686; H04N 7/26696; G06T 9/00; G06T 9/004
USPC ........................ 382/154, 232, 233, 236, 294; 348/385.1, 397.1
See application file for complete search history.

(56) References Cited

U.S. PATENT DOCUMENTS

| | | | |
|---|---|---|---|
| 6,043,838 A * | 3/2000 | Chen | 348/42 |
| 6,999,513 B2 | 2/2006 | Sohn et al. | |
| 7,463,778 B2 * | 12/2008 | Damera-Venkata | 382/236 |
| 7,646,875 B2 * | 1/2010 | Schuijers et al. | 381/23 |
| 2002/0009137 A1 | 1/2002 | Nelson et al. | |
| 2003/0202592 A1 | 10/2003 | Sohn et al. | |
| 2005/0185712 A1 | 8/2005 | Lee | |
| 2007/0081814 A1 * | 4/2007 | Ha et al. | 396/310 |
| 2007/0177812 A1 * | 8/2007 | Yang | 382/233 |
| 2008/0130984 A1 * | 6/2008 | Ahn et al. | 382/154 |
| 2008/0219351 A1 | 9/2008 | Kim et al. | |

FOREIGN PATENT DOCUMENTS

| | | |
|---|---|---|
| CN | 1226786 A | 8/1999 |
| KR | 100481732 B1 | 4/2005 |
| KR | 10-2005-0076441 A | 7/2005 |
| KR | 10-0738867 B1 | 7/2007 |

(Continued)

OTHER PUBLICATIONS

Cho, et al. "Disparity-Compensated Stereoscopic Video Coding Using the MAC in MPEG-4." ETRI Journal. 27.3 (2005): 326-329. Print.*

(Continued)

*Primary Examiner* — Michael A Newman
(74) *Attorney, Agent, or Firm* — Sughrue Mion, PLLC

(57) ABSTRACT

An apparatus and method for encoding and decoding a multi-view image including a stereoscopic image are provided. The apparatus for encoding a multi-view image includes a base layer encoding unit that encodes a base layer image to generate a base layer bit stream, a view-based conversion unit that performs view-based conversion of the base layer image to generate a view-converted base layer image, a subtractor obtaining a residual between a enhancement layer image and the view-converted base layer image, and an enhancement layer encoding unit that encodes the obtained residual to generate an enhancement layer bit stream.

24 Claims, 4 Drawing Sheets

(56) References Cited

FOREIGN PATENT DOCUMENTS

| KR | 10-0783722 B1 | 12/2007 |
| WO | 2005069630 A1 | 7/2005 |
| WO | WO 2006062377 A1 * | 6/2006 |
| WO | 2006/110007 A1 | 10/2006 |
| WO | WO 2007011147 A1 * | 1/2007 |
| WO | 2008088497 A2 | 7/2008 |

OTHER PUBLICATIONS

Ohm, Jens-Rainer. "Stereo/Multiview Video Encoding Using the MPEG Family of Standards." SPIE Conference on Stereoscopic Displays and Applications X. 3639. (1999): 242-253. Print.*

International Search Report [PCT/ISA/210] and Written Opinion [PCT/ISA/237] issued Sep. 8, 2010, in counterpart International Application No. PCT/KR/2010/000694.

Communication dated Aug. 3, 2012 issued by the European Patent Office in corresponding European Patent Application No. 10738746.6.

Communication dated Jul. 9, 2013, issued by the Japanese Patent Office in counterpart Japanese Application No. 2011-549065.

Ying Chen et al., "View scalability information SEI message for MVC", Joint Video Team of ISO/IEC MPEG and ITU-T VCEG, Apr. 21-27, 2007, San Jose, California, pp. 1-10.

Communication dated Jul. 17, 2013, issued by the State Intellectual Property Office of P.R.C. in counterpart Chinese Application No. 201080006714.3.

Communication dated Nov. 12, 2013, issued by the Japanese Patent Office in corresponding Application No. 2011-549065.

H.264/MPEG-4 AVC, Compact Series No. 1, ISBN 978-4-88657-651-4, Sep. 16, 2009, 10 total pages.

* cited by examiner

APPARATUS AND METHOD FOR ENCODING AND DECODING MULTI-VIEW IMAGE

PRIORITY

This application claims priority Korean Patent Application No. 10-2009-0009066 filed Feb. 4, 2009 in the Korean Intellectual Property Office, the entire contents of which are hereby incorporated by reference.

BACKGROUND

1. Field

Apparatuses and methods consistent with the exemplary embodiments relate to encoding and decoding an image, and more particularly to encoding and decoding a multi-view image including a stereoscopic image while maintaining the compatibility with a certain video codec.

2. Description of the Related Art

In a Moving Picture Experts Group (MPEG)-2 multi-view profile, a standard for supporting a three-dimensional (3D) image service using MPEG-2 has been established, but has not yet been used due to problems that it has a low encoding efficiency and it should be based on MPEG-2. In the following description, it should be understood that a stereoscopic image means a two-view image composed of a left-side image and a right-side image, and a 3D image means a multi-view image (e.g., more than two-view image) including the stereoscopic image. Also, the International Organization for Standardization/International Electrotechnical Commission (ISO/IEC) and the International Telecommunication Union (ITU) progress the standard for an encoding method of a multi-view image, but have a structure based on H.264.

Accordingly, it is required to utilize an existing codec, but a system which is not based on MPEG-2 and H.264 cannot utilize the existing codec. In order to effectively service a 3D image in a state in which diverse codecs, such as Digital Cinema, and the like, are utilized, there is a need for a scheme for newly supporting a 3D image while utilizing the existing codec. This scheme is required for effective enhancement in a system which intends to support the 3D image in addition to Digital Cinema, but is not currently based on H.264 or MPEG-2.

SUMMARY

Exemplary embodiments provide an apparatus and method for encoding and decoding a 3D image while maintaining compatibility with an existing video codec.

Exemplary embodiment also provide an apparatus and method for encoding and decoding a 3D mage in a layer structure.

Exemplary embodiments also provide an apparatus and method for encoding and decoding a multi-view image in a layer structure.

According to an aspect of an exemplary embodiment, there is provided a method for encoding a multi-view image, which includes encoding a base layer image to generate a base layer bit stream; performing view-based conversion on the base layer image to generate a view-converted base layer image; obtaining a residual between an input enhancement layer image and the view-converted base layer image; and encoding the obtained residual to generate an enhancement layer bit stream.

According to an aspect of another exemplary embodiment, there is provided an apparatus for encoding a multi-view image, which includes a base layer encoding unit that encodes a base layer image to generate a base layer bit stream; a view-based conversion unit that performs view-based conversion on the base layer image to generate a view-converted base layer image; a residual detection unit that obtains a residual between an input enhancement layer image and the view-based-converted base layer image; and an enhancement layer encoding unit that encodes the obtained residual to generate an enhancement layer bit stream.

According to an aspect of another exemplary embodiment, there is provided a method for decoding a multi-view image, which includes reconstructing a base layer bit stream to generate a reconstructed base layer image; performing view-based conversion on the reconstructed base layer image to generate a view-based-converted base layer image; decoding an input enhancement layer bit stream to obtain a residual; and adding the residual to the view-based-converted base layer image to generate an enhancement layer image.

According to an aspect of another exemplary embodiment, there is provided an apparatus for decoding a multi-view image, including: a base layer decoding unit that reconstructs an input base layer bit stream to generate a base layer image to generate a reconstructed base layer image; a view-based conversion unit that performs view-based conversion on the reconstructed base layer image; an enhancement layer decoding unit that decodes an input enhancement layer bit stream to generate a residual; and an image reconstruction unit that adds the residual to the view-based-converted base layer image to generate an enhancement layer image.

By using the hierarchical structure of the exemplary embodiments, it is possible to compress and encode a stereoscopic image while maintaining the compatibility with a certain video codec. Therefore, when it is necessary to newly compress and transmit a stereoscopic image in an environment using various codecs as in the conventional digital cinema, it is possible to add a new service while using the existing codecs. Also, by receiving only a part of a bit stream, the existing decoders can continuously provide existing services from the bit stream made by a new system.

BRIEF DESCRIPTION OF THE DRAWINGS

The above and other aspects will be more apparent from the following detailed description of exemplary embodiments taken in conjunction with the accompanying drawings, in which.

DETAILED DESCRIPTION OF EXEMPLARY EMBODIMENTS

Figure 1:
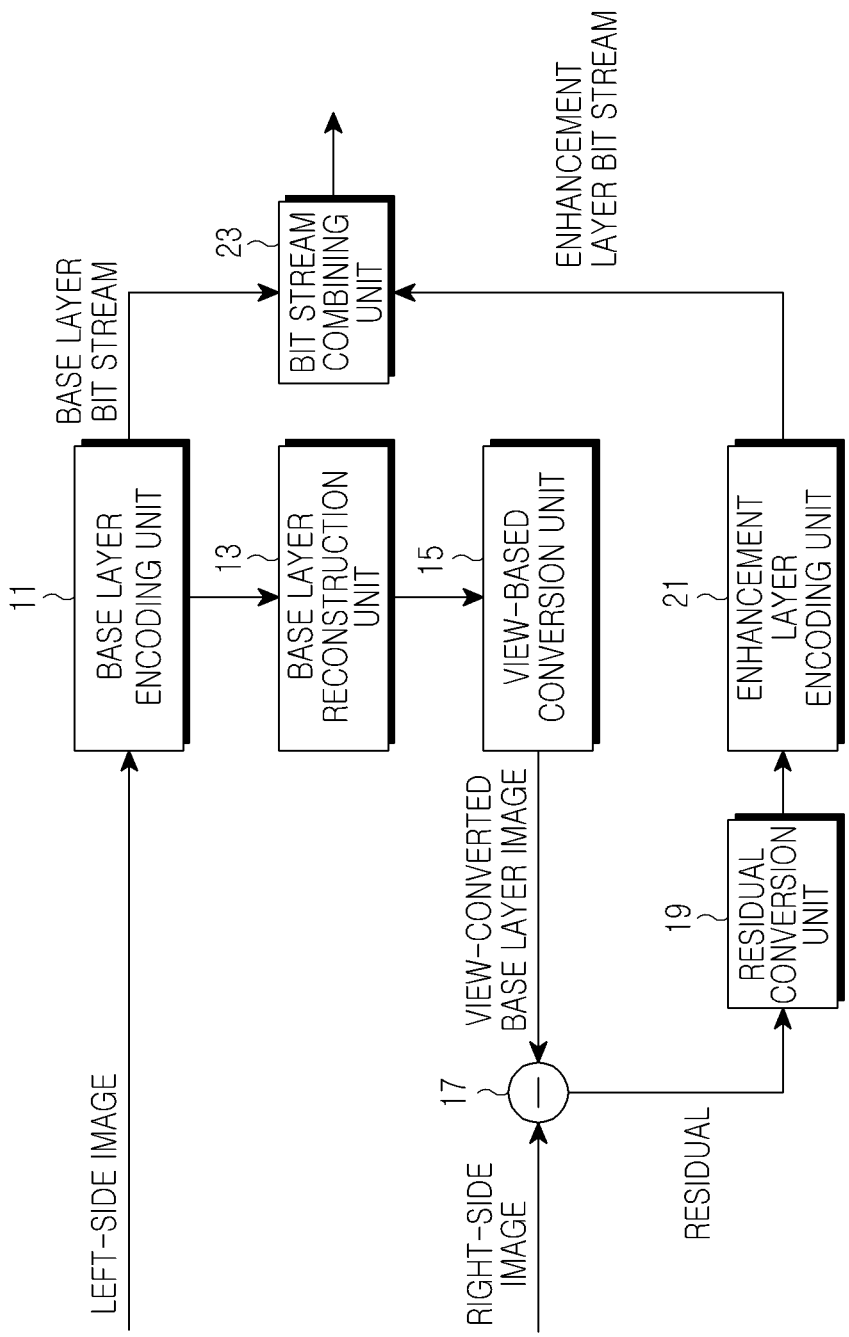
FIG. 1 is a view illustrating the configuration of a layer multi-view image encoding apparatus according to an exemplary embodiment.

Hereinafter, exemplary embodiments will be described with reference to the accompanying drawings. In the following description, the same elements will be designated by the same reference numerals although they are shown in different drawings. Further, various specific definitions found in the following description, such as specific kinds of codecs, such as H.264 or VC-1, etc., are provided only to help general understanding, and it is apparent to those skilled in the art that the inventive concept can be implemented without such definitions. Further, in the following description, a detailed description of known functions and configurations incorporated herein may be omitted.

In order to make to provide a new 3D image service while maintaining the compatibility with a certain existing codec, in an exemplary embodiment, 3D image encoding and decoding apparatuses are designed in a layer structure. Hereinafter, in exemplary embodiments, a scheme for encoding and decoding a stereoscopic image composed of a left-side image and a right-side image will be exemplified. However, the inventive concept is not limited to a stereoscopic image, and may be applied to a multi-view image (e.g., more than two-view image) in the same manner.

In an exemplary embodiment, the image encoding apparatus is so configured that in a base (or lower) layer, the base layer image is compressed and encoded through the existing 2D image codec, and in an enhancement (or upper) layer, 3D image data is compressed and encoded by compressing and encoding an image having a view point different from that of the image of the base layer. In this case, the enhancement layer does not utilize a codec structure that is similar to that of the base layer in the same manner as the existing method, but instead converts the view point of the base layer into the view point of the enhancement layer regardless of the kind of the coded used in the base layer, compresses and encodes a difference between the two view points in the enhancement layer to transmit the encoded difference. Accordingly, when the encoded difference is decoded in a decoding apparatus, data having a view point different from that of the base layer can be reconstructed by combining the data obtained through the view-based conversion and the reconstructed data from the enhancement layer after reconstructing the base layer, and as needed, the existing 2D image can be reconstructed by decoding only the base layer.

FIG. 1 is a view illustrating the configuration of a layer multi-view image encoding apparatus according to an exemplary embodiment.

A left-side image (i.e., the first image) and a right-side image (i.e., the second image) are input to the encoding apparatus of FIG. 1 through separate cameras, input interfaces, or files. One of the left-side image and the right-side image is input to and encoded by the base layer and the remaining image is input to and encoded by the enhancement layer. Hereinafter, in an exemplary embodiment, it is assumed that the left-side image is input to the base layer and the right-side image is input to the enhancement layer. However, the reverse could be also possible.

If the 2D image or the image corresponding to the left eye, i.e., the left-side image, is input to the image codec, a base layer encoding portion of the image codec compresses and encodes the input left-side image. Here, the image codec may be a well-known image codec, such as H.264 or VC-1. Referring to FIG. 1, as a base layer encoding unit 11, an encoding portion of a well-known image codec may be used, and through this, the image encoding apparatus of FIG. 1 has compatibility with the existing image codec. In other words, the image encoding apparatus of FIG. 1 may have an interface unit for inputting the left-side image compressed and encoded from a certain image codec as the base layer bit stream.

Also, in order to encode the right-side image, the image encoding apparatus of FIG. 1 converts the reconstructed image of the left-side image into the view point of the right-side image. That is, if the left-side image compressed and encoded is input from the base layer encoding unit 11, a base layer reconstruction unit 13 reconstructs the left-side image compressed and encoded into a base layer image.

Then, a view-based conversion unit 15 of FIG. 1 performs a view-based conversion of the reconstructed base layer image that corresponds to a left eye or one view point into an image that corresponds to a right eye or another view point. Specifically, the view-based conversion unit 15 estimates the degree of displacement (e.g., a displacement vector such as a motion vector) between the left-side image and the right-side image, and performs the view-based conversion of the left-side image into the right-side image using the estimated displacement. That is, the displacement estimation and compensation unit 15 operates as a view converter that converts an image of one view point (e.g., left-side image) into an image of another view point (e.g., right-side image). The view-converted image is used as a prediction image of the right-side image in a prediction encoding structure.

A residual detection unit 17 of FIG. 1 may be implemented by a subtractor, and subtracts between the image view-converted using the estimated displacement (i.e., the estimated image) and the image having the view point different from that of the reconstructed image. As described above, according to an exemplary embodiment, the residual can be obtained by obtaining a difference between the input left-side image and the prediction image of the right-side image.

A residual conversion unit 19 of FIG. 1 controls the range of the residual obtained by the residual detection unit 17, and an enhancement layer encoding unit 21 compresses and encodes the range-controlled residual. A bit-stream combining unit 23 of FIG. 1 combines the enhancement layer bit stream with the base layer bit stream. Accordingly, the compressed and encoded bit stream of the base layer and the bit stream of the enhancement layer obtained by compressing and encoding the residual are reconstructed into a single bit stream to be transmitted. In this case, in order to determine whether a specified unit of the bit stream belongs to the base layer or the enhancement layer, for example, a flag may be inserted. A multiplexer may be used as the bit-stream combining unit 23.

Figure 3:
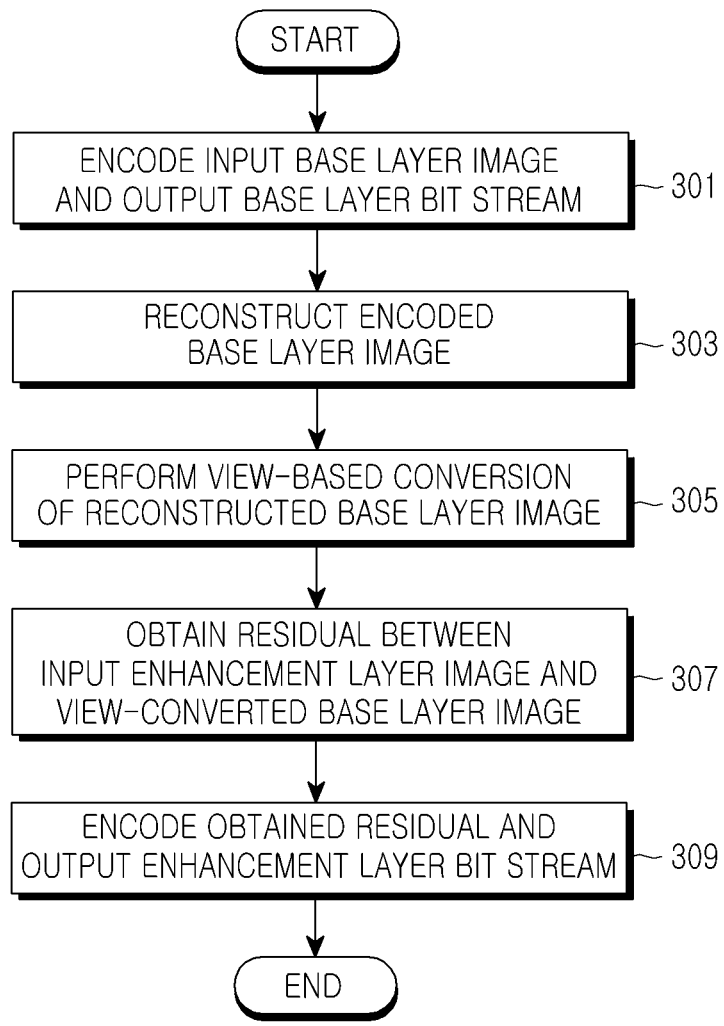
FIG. 3 is a flowchart illustrating an operation of the multi-view image encoding apparatus of FIG. 1 according to an exemplary embodiment.

FIG. 3 is a flowchart illustrating an operation of the multi-view image encoding apparatus of FIG. 1 according to an exemplary embodiment.

Referring to FIG. 3, in operation 301, the base layer encoding unit 11 encodes the input base layer image (e.g., the left-side image) and outputs a base layer bit stream. In operation 303, a base layer reconstruction unit 13 reconstructs the encoded base layer image, and in operation 305, the view-based conversion unit 15 that performs the function of a view converter converts the reconstructed base layer image into the view point of the enhancement layer image (e.g., the right-side image). Then, in operation 307, the subtractor 17 outputs a difference between the input enhancement layer image and the view-converted base layer image as the residual, and in operation 309, the enhancement layer encoding unit 21 encodes the residual and outputs an enhancement layer bit stream.

If a plurality of enhancement layer images are provided, the respective enhancement layer images have different view points, and the view-based conversion is performed for each enhancement layer.

Figure 2:
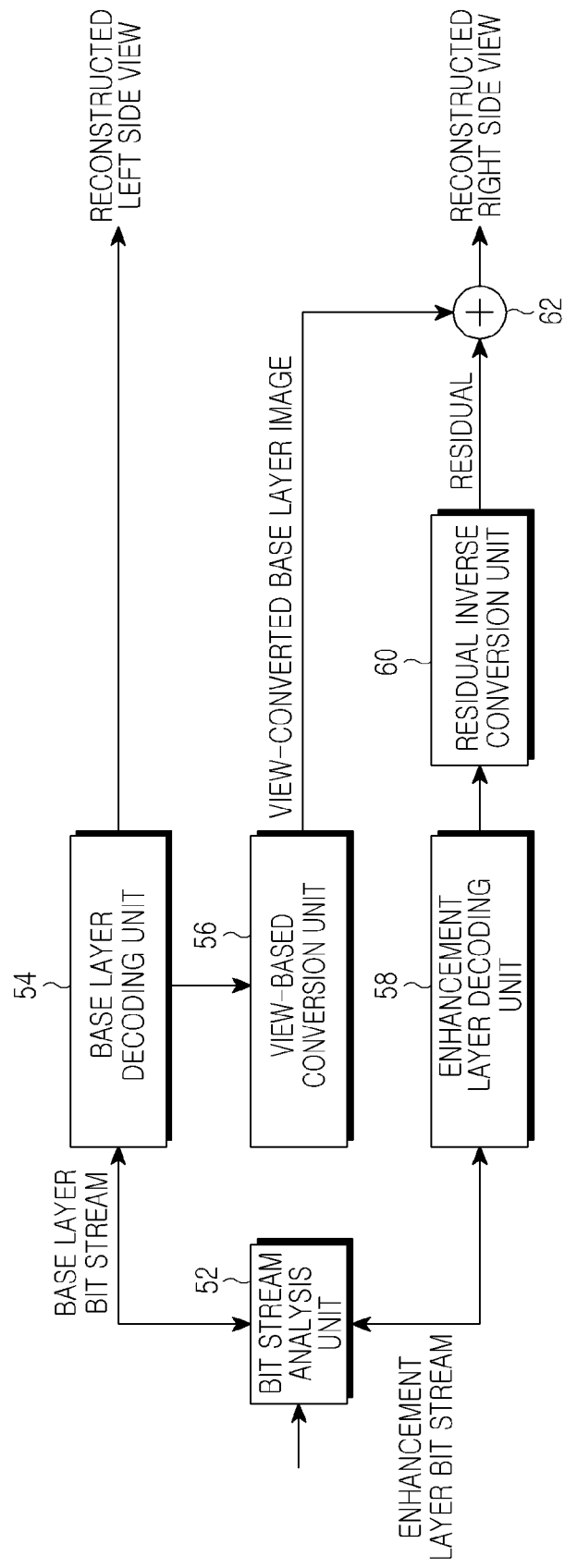
FIG. 2 is a view illustrating the configuration of a layer multi-view image decoding apparatus according to an exemplary embodiment.

FIG. 2 is a view illustrating the configuration of a layer multi-view image decoding apparatus according to an exemplary embodiment.

Referring to FIG. 2, a bit stream analysis unit 52 corresponds to the bit stream combining unit 23 of FIG. 1. The bit stream analysis unit 52 separates the input bit stream into an enhancement layer bit stream and a base layer bit stream based on the flag. That is, the bit stream analysis unit 52 checks the flag to determine whether the input bit stream is an enhancement layer bit stream or a base layer bit stream. If it is determined that the input bit stream is the enhancement layer bit stream, the bit stream analysis unit 52 transfers the input bit stream to the enhancement layer decoding portion. If it is determined that the input bit stream is the base layer bit stream, the bit stream analysis unit 52 transfers the input bit stream to the base layer decoding portion.

In FIG. 2, the base layer decoding unit 54 decodes the base layer to obtain the reconstructed left-side image. Here, the base layer decoding unit 54 corresponds to the base layer encoding unit 11 of FIG. 1, and may be implemented using a base layer decoding portion of the existing image codec such as H.264 or VC-1. In other words, the image decoding apparatus of FIG. 2 may have an interface unit for inputting the reconstructed left-side image output from a certain image codec.

In FIG. 2, a view-based conversion unit 56 performs a view-based conversion of the left-side image reconstructed by the base layer decoding unit 54 into an image of a different view point, e.g., a right-side image. That is, the view-based conversion unit 56 performs the view-based conversion of the reconstructed left-side image into the right-side image that corresponds to the view point of the enhancement layer image using displacement information (e.g., a displacement vector such as a motion vector) transferred through the bit stream to output a prediction image.

The bit stream transferred to the enhancement layer in FIG. 2 is input to the enhancement layer decoding unit 58. The enhancement layer decoding unit 58 reconstructs the residual encoded by the image encoding apparatus of FIG. 1 and transferred as the enhancement layer bit stream. The residual, as described above, means a difference between the left-side image and the prediction image of the right-side image. The residual inverse conversion unit 60 performs an inverse process of the conversion performed by the residual conversion unit of FIG. 1.

In FIG. 2, an image reconstruction unit 62 may be implemented by an adder, and reconstructs the right-side image by adding the residual output from the residual inverse conversion unit 60 to the image view-converted from the base layer. Here, the image view-converted from the base layer is output from the view-based conversion unit 56.

On the other hand, if only the bit stream of the base layer is to be reconstructed without regard to the bit stream of the enhancement layer extracted by the bit stream analysis unit 52 of FIG. 2, a 2D image may be reconstructed using the existing 2D image standard method.

Figure 4:
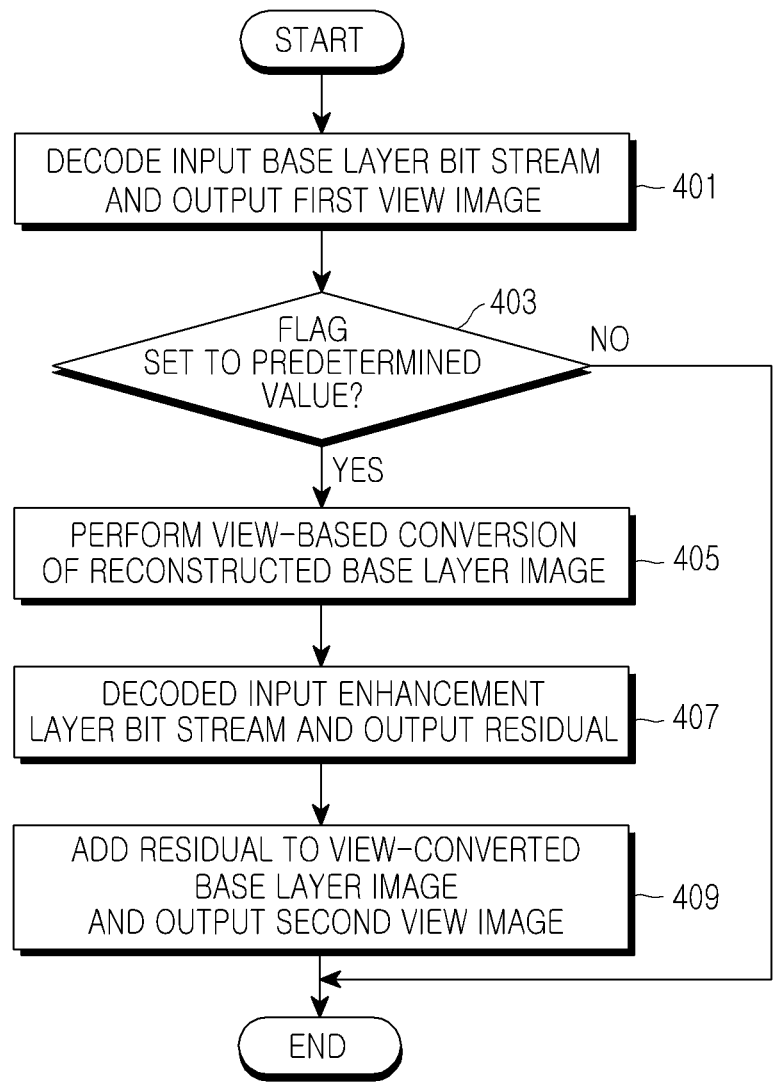
FIG. 4 is a flowchart illustrating an operation of the multi-view image decoding apparatus of FIG. 2 according to an exemplary embodiment.

FIG. 4 is a flowchart illustrating an operation of the multi-view image decoding apparatus of FIG. 2 according to an exemplary embodiment.

Referring to FIG. 4, in operation 301, the base layer decoding unit 54 decodes the input base layer bit stream and outputs a first-view image (e.g., left-side image). On the other hand, in the base layer bit stream and the enhancement layer bit stream, flag information indicating whether the corresponding bit stream is the enhancement layer image that requires the view-based conversion may be included. Accordingly, if the enhancement layer bit stream is input, the bit stream analysis unit 52 of FIG. 2 can recognize whether the corresponding bit stream is the enhancement layer bit stream by confirming the flag information.

If it is determined that the corresponding bit stream is the enhancement layer bit stream in operation 403, the view-based conversion unit 56, which performs the function of the view-based converter, converts the reconstructed base layer image into the view point of the enhancement layer image (e.g., the right-side image) in operation 405. Then, in operation 407, the enhancement layer decoding unit 58 decodes the input enhancement layer bit stream and outputs the residual. In operation 409, the adder 62 adds the residual to the view-converted base layer image and outputs the second-view image, i.e., the enhancement layer image.

As described above with reference to FIG. 4, if a plurality of enhancement layer images is provided, the respective enhancement layer images have different view points, and the view-based conversion is performed for each enhancement layer.

Although exemplary embodiments have been described for illustrative purposes, it will be apparent that various modifications are possible without departing from the scope of the inventive concept. Accordingly, the inventive concept should not be limited to the above-described exemplary embodiments, and should be defined by the accompanying claims to be described later and equivalents thereof.

For example, although in the exemplary embodiments, a signal view point or two view points (i.e., the left-side image and the right-side image) have been described, it is also possible to enhance the image encoding and decoding methods according to an exemplary embodiment into a plurality of layers in order to layer-encode a plurality of view points. Here, the plurality of view points may correspond, for example, to a left-side image, a right-side image, and a center image input through three cameras, respectively. In this case, layers for processing the right-side image and the center image may exist around the base layer that processes the left-side image.

Hereinafter, the configuration example of the image encoding and decoding apparatuses that layer-encode the plurality of time points according to an exemplary embodiment will be described.

In an exemplary embodiment, an apparatus for encoding a 3D image, i.e., a multi-view image, includes a base layer processing unit compressing and encoding a first image among input first to n-th images (where, n is a natural number that is equal to or greater than 2); first to (n−1)-th enhancement layer processing units performing a view-based conversion of the second to n-th images so that the n-th image has a view point different from a view point of another image (e.g., in the case of the second image, the view point different from that of the first image, and in the case of the third image, the view point different from that of the first or second image), obtaining a difference in view point (e.g., a residual) between the n-th image and the other image, and compressing and encoding the residual; and a bit stream combining unit reconstructing the bit stream by combining the bit stream output from the base layer processing unit and the bit streams output from the first to (n−1)-th enhancement layer processing units.

Also, in an exemplary embodiment, an apparatus for decoding a 3D image, i.e., a multi-view image, includes a bit stream analysis unit separating the input bit stream into first to (n−1)-th (where, n is a natural number that is equal to or greater than 2); a base layer decoding unit reconstructing an input first image by decoding the separated base layer bit stream; and first to (n−1)-th enhancement layer processing units reconstructing input second to n-th images by decoding and converting the first to (n−1)-th enhancement layer bit streams so that the decoded bit streams have the corresponding view point using the detected view point information.

Also, it is possible to use one or more displacement vectors (e.g., motion vectors) as conversion variables in order to convert the view point of the base layer into a view point of the enhancement layer, and to insert these displacement vectors into the bit stream.

In order to convert the view point of the base layer into the view point of the enhancement layer, a certain function may be used, and parameters related to the function may be inserted into the bit stream. Here, a certain function may be a function that can express a difference between the left-side image and the right-side image as a difference between pixel unit values.

Also, the conversion of the view point of the base layer into the view points of the enhancement layers may be selectively performed in the whole sequence unit or in the current frame unit. Here, the whole sequence means a plurality of scenes constituting a moving image for a certain time, and the current frame means a single scene. In other words, the case as illustrated in FIG. 1 corresponds to the single scene, and for each of the plurality of images, the left-side image and the right-side image exist.

As described above, the displacement vectors and parameters required to selectively perform the view-based conversion in the whole sequence unit or in the current frame unit may be inserted into a sequence header or a frame/field header While the exemplary embodiments been shown and described, it will be understood by those skilled in the art that various changes in form and details may be made therein.

What is claimed is:

1. An encoding method for encoding a multi-view image, the method comprising:
   encoding a base layer image to generate a base layer bit stream;
   performing view-based conversion on the base layer image to generate a view-converted base layer image;
   obtaining a residual image between an enhancement layer image and the view-converted base layer image obtained by subtracting the enhancement layer image from the view-converted base layer image; and
   encoding the obtained residual to generate an enhancement layer bit stream.

2. The method according to claim 1, wherein flag information for discriminating between the base layer bit stream and the enhancement layer bit stream is inserted into the base layer bit stream and the enhancement layer bit stream.

3. The method according to claim 1, wherein the view-based conversion is performed by estimating a displacement vector between the base layer image and the enhancement layer image.

4. The method according to claim 1, wherein the performing the view-based conversion comprises:
   reconstructing the encoded base layer image to generate a reconstructed base layer image; and
   converting a view point of the reconstructed base layer image into a view point of the enhancement layer image.

5. The method according to claim 1, wherein the multi-view image is a stereoscopic image, the base layer image corresponds to one of a left-side image and a right-side image, and the enhancement layer image corresponds to the other one of the left-side image and the right-side image.

6. The method according to claim 1, wherein a plurality of enhancement layer images are provided, the respective enhancement layer images have different view points, and the view-based conversion and the encoding of the residual are performed for each enhancement layer.

7. An apparatus for encoding a multi-view image, the apparatus comprising:
   a base layer encoding unit that encodes a base layer image to generate a base layer bit stream;
   a view-based conversion unit that performs view-based conversion on the base layer image to generate a view-converted base layer image;
   a residual detection unit that obtains a residual image between an enhancement layer image and the view-converted base layer image obtained by subtracting the enhancement layer image from the view-converted base layer image; and
   an enhancement layer encoding unit that encodes the obtained residual to generate an enhancement layer bit stream.

8. The apparatus according to claim 7, wherein flag information for discriminating between the base layer bit stream and the enhancement layer bit stream is inserted into each of the base layer bit stream and the enhancement layer bit stream.

9. The apparatus according to claim 7, wherein the view-based conversion unit performs the view-based conversion by estimating a displacement vector between the base layer image and the enhancement layer image.

10. The apparatus according to claim 7, further comprising a base layer reconstruction unit that reconstructs the encoded base layer image to generate a reconstructed base layer image;
    wherein the view point conversion unit converts a view point of the reconstructed base layer image into a view point of the enhancement layer image.

11. The apparatus according to claim 7, wherein the multi-view image is a stereoscopic image, the base layer image corresponds to one of a left-side image and a right-side image, and the enhancement layer image corresponds to the other one of the left-side image and the right-side image.

12. The apparatus according to claim 7, wherein a plurality of enhancement layer images are provided, the respective enhancement layer images have different view points, and the view-based conversion unit performs the view-based conversion of the residual and the enhancement layer encoding unit encodes the residual for each enhancement layer.

13. A method for decoding a multi-view image, the method comprising:
    reconstructing a base layer bit stream to generate a reconstructed base layer image;
    performing view-based conversion on the reconstructed base layer image to generate a view-converted base layer image;
    decoding an enhancement layer bit stream to obtain a residual image obtained by subtracting an enhancement layer image from the view-converted base layer image; and
    adding the residual to the view-converted base layer image to generate the enhancement layer image.

14. The method according to claim 13, wherein flag information for discriminating between the base layer bit stream and the enhancement layer bit stream is included in each of the base layer bit stream and the enhancement layer bit stream.

15. The method according to claim 13, wherein the view-based conversion is performed by estimating a displacement vector between the base reconstructed layer image and the enhancement layer image.

16. The method according to claim 13, wherein the performing the view-based conversion comprises converting a view point of the reconstructed base layer image into a view point of the enhancement layer image.

17. The method according to claim 13, wherein the multi-view image is a stereoscopic image, the base layer image corresponds to one of a left-side image and a right-side image, and the enhancement layer image corresponds to the other one of the left-side image and the right-side image.

18. The method according to claim 13, wherein a plurality of enhancement layer images are provided, the respective enhancement layer images have different view points, and the view-based conversion is performed for each enhancement layer.

19. An apparatus for decoding a multi-view image, the apparatus comprising:
 a base layer decoding unit that reconstructs a base layer bit stream to generate a reconstructed base layer image;
 a view-based conversion unit that performs view-based conversion on the reconstructed base layer image;
 an enhancement layer decoding unit that decodes an enhancement layer bit stream to obtain a residual image obtained by subtracting an enhancement layer image from the view-converted base layer image; and
 an image reconstruction unit that adds the residual to the view-converted base layer image to generate the enhancement layer image.

20. The apparatus according to claim 19, wherein flag information for discriminating between the base layer bit stream and the enhancement layer bit stream is included in each bit stream.

21. The apparatus according to claim 19, wherein the view-based conversion unit performs the view-based conversion by estimating a displacement vector between the reconstructed base layer image and the enhancement layer image.

22. The apparatus according to claim 19, wherein the view point conversion unit converts a view point of the reconstructed base layer image into a view point of the enhancement layer image.

23. The apparatus according to claim 19, wherein the multi-view image is a stereoscopic image, the base layer image corresponds to one of a left-side image and a right-side image, and the enhancement layer image corresponds to the other one of the left-side image and the right-side image.

24. The apparatus according to claim 19, wherein a plurality of enhancement layer images are provided, the respective enhancement layer images have different view points, and the view-based conversion unit performs the view-based conversion for each enhancement layer.

* * * * *